US011735763B2

(12) United States Patent
Tsutomu

(10) Patent No.: US 11,735,763 B2
(45) Date of Patent: Aug. 22, 2023

(54) SOLID STATE ELECTROLYTE RECHARGEABLE BATTERY IN NO USE OF SEPARATOR

(71) Applicant: Piotrek Co., Ltd., Kyoto (JP)

(72) Inventor: Sada Tsutomu, Kyoto (JP)

(73) Assignee: Piotrek Co., Ltd., Kyoto (JP)

(*) Notice: Subject to any disclaimer, the term of this patent is extended or adjusted under 35 U.S.C. 154(b) by 0 days.

(21) Appl. No.: 17/140,594

(22) Filed: Jan. 4, 2021

(65) Prior Publication Data
US 2021/0135272 A1 May 6, 2021

Related U.S. Application Data

(63) Continuation of application No. 16/964,315, filed as application No. PCT/JP2018/018439 on Apr. 27, 2018.

(30) Foreign Application Priority Data

Jan. 24, 2018 (JP) .................................. 2018-22496

(51) Int. Cl.
H01M 10/056 (2010.01)
H01M 4/131 (2010.01)
H01M 10/0525 (2010.01)
H01M 4/02 (2006.01)

(52) U.S. Cl.
CPC ......... *H01M 10/056* (2013.01); *H01M 4/131* (2013.01); *H01M 10/0525* (2013.01); *H01M 2004/028* (2013.01); *H01M 2300/0065* (2013.01)

(58) Field of Classification Search
CPC .................................................. H01M 10/056
See application file for complete search history.

(56) References Cited

U.S. PATENT DOCUMENTS

| | | | |
|---|---|---|---|
| 7,732,099 B2 | 6/2010 | Ogata et al. | |
| 7,773,030 B2 | 8/2010 | Xia et al. | |
| 9,005,817 B2 | 4/2015 | Ichikawa | |
| 9,562,126 B2 | 2/2017 | Ogata et al. | |
| 9,979,037 B2 | 5/2018 | Ogata et al. | |
| 2011/0045355 A1 | 2/2011 | Ichikawa | |
| 2014/0287324 A1 | 9/2014 | Tsuchida et al. | |
| 2015/0188124 A1 | 7/2015 | Ichikawa | |
| 2017/0331092 A1* | 11/2017 | Chen | H01M 50/461 |
| 2018/0006328 A1* | 1/2018 | O'Neill | C08L 71/02 |
| 2018/0166759 A1* | 6/2018 | Zhamu | H01M 10/056 |
| 2018/0277909 A1* | 9/2018 | Harada | H01M 10/0562 |
| 2018/0340061 A1* | 11/2018 | Ogata | B32B 27/308 |
| 2019/0288338 A1* | 9/2019 | Tokuda | H01M 10/056 |
| 2021/0119253 A1* | 4/2021 | Mikuni | H01M 10/056 |

FOREIGN PATENT DOCUMENTS

| | | | |
|---|---|---|---|
| EP | 3211033 A1 | 8/2017 | |
| JP | 3-129603 A | 6/1991 | |
| JP | 3129603 A | 6/1991 | |
| JP | 2002313424 A | 10/2002 | |
| JP | 2006049158 A | 2/2006 | |
| JP | 2006-190556 A | 7/2006 | |
| JP | 2006190556 A | 7/2006 | |
| JP | 2006-339054 A | 12/2006 | |
| JP | 2006339054 A | 12/2006 | |
| JP | 2011-65982 A | 3/2011 | |
| JP | 2011065982 A | 3/2011 | |
| JP | 2014238925 A | 12/2014 | |
| JP | 2015038870 A * | 2/2015 | |
| WO | 04088671 A1 | 10/2004 | |
| WO | 10013971 A2 | 2/2010 | |
| WO | 10113971 A1 | 10/2010 | |
| WO | 13073038 A1 | 5/2013 | |
| WO | 2016-063994 A1 | 4/2016 | |
| WO | 16063994 A1 | 4/2016 | |
| WO | WO-2016063994 A1 * | 4/2016 | ............ B32B 9/041 |
| WO | 17126701 A1 | 7/2017 | |

OTHER PUBLICATIONS

JP2015038870A Translation from Espacenet (Year: 2015).*
International Search Report dated Jul. 10, 2018 issued in corresponding PCT/JP2018/018439 application (2 pages).
English Abstract of JP 3-129603 A published Jun. 3, 1991.
English Abstract of JP 2006-190556 A published Jul. 20, 2006.
English Abstract of JP 2006-339054 A published Dec. 14, 2006.

* cited by examiner

*Primary Examiner* — Nathanael T Zemui
(74) *Attorney, Agent, or Firm* — Millen, White, Zelano and Branigan, P.C.; Harry B. Shubin

(57) ABSTRACT

Solid state solid electrolyte rechargeable battery in no use of separator comprising a positive electrode/a conductive polymer solid state electrolyte layer/a negative electrode in which the solid state electrolyte layer is a composition comprising an inorganic solid electrolyte and a polymer electrolyte composition wherein the polymer electrolyte composition is selected from the group consisting of a polymer electrolyte composition ($X^1$) obtained by graft polymerizing or living radical polymerization of a molten salt monomer having a polymerizable functional group and having an onium cation and an anion containing a halogen with a fluoro polymer, and a polymer electrolyte composition comprising ($X^1$) and at least one kind selected from the following ($X^2$) and ($X^3$), $X^2$: a molten salt having an onium cation and an anion containing a halogen, or a molten salt monomer having a polymerizable functional group and having an onium cation, $X^3$: a polymer or copolymer of a molten salt monomer having a polymerizable functional group and having an onium cation.

By providing this rechargeable battery, the solid electrolyte rechargeable battery without separator which has a descending effect of particle interface resistance between a positive and negative active materials in case of using conductive polymer solid electrolyte, a thin film cell, a less dependence on the temperature and excellent safety in case of happening short circuit can be obtained.

8 Claims, No Drawings

SOLID STATE ELECTROLYTE RECHARGEABLE BATTERY IN NO USE OF SEPARATOR

FIELD OF THE INVENTION

This invention relates to solid state electrolyte rechargeable battery in no use of separator which has been efficiently refrained the internal resistance such as interface resistance between a positive active material and a negative active material in case of using a conductive polymer solid electrolyte, a thin film cell, a less dependence on the operating temperature and an excellent safety in case of happening a short circuit. And it will be anticipated greatly in practical applications.

BACKGROUND ART

Various composite polymer electrolyte composition having an excellent conductive property have been popularly known. For example, PCT-WO2004/88671 (Patent reference 1) and PCT-WO2010/113971 (Patent reference 2) propose a composite polymer electrolyte composition prepared by polymerizing like grafting the electrochemically inert polymeric reinforcing material such as polyvinylidene fluoride with the molten salt polymer having a quaternary ammonium salt structure comprising quaternary ammonium cation group and anion group containing halogen atom, and also containing a charge transfer ion source. Further, PCT-WO2016/0633994 (Patent reference 3) proposes a composite polymer electrolyte composition comprising adding a fluoropolymer to the above composite polymer electrolyte composition as described in Patent reference 1 or Patent reference 2, and the rechargeable battery using this polymer electrolyte composition. However, in case of using only these composite polymer electrolyte compositions, it is essential to use a separator. Further Japanese Patent Kokai No. 2002-313424 (Patent reference 4) proposes a rechargeable battery in no use of separator, using a composition comprising a conductive polyether polymer and a ceramic whisker. However, this composite polymer electrolyte composition has not sufficient conductivity property and much dependence on the temperature, and also it has a lack of low temperature property since it has a usage restriction because of Tg at higher than zero degree C., that is, this polyether type materials perform as the most excellent property at higher than 60° C. Further, Japanese Patent Kokai No. 2014-238925 (Patent reference 5) proposes a solid electrolyte comprising a Garnet solid inorganic electrolyte layer and a polyether polymer conductive polyether layer.

However, by being influenced to the conductivity restriction of polyether polymer, this method has some disadvantage such as the intrinsic conductivity of Garnet solid electrolyte is made downward drastically and the temperature dependence is much since the low temperature property is fairly worse. Further, PCT-WO2013/073038 (Patent reference 6) propose a sintering in the method of descending particle interface resistance between a positive and a negative active materials in case of using only Garnet inorganic solid electrolyte, and a physical processing such as electrode crimping sulfide material such as lithium sulfide to particle interface coated solid electrolyte. However, this method has an excessive loading process in mass production. As means of solving these problems, the conductive polymer-solid electrolyte system of rechargeable battery as this invention enables the optimization in practical usages.

PRIOR ARTS

Patent Reference

Patent Reference 1: PCT-WO2004/088671
Patent Reference 2: PCT-WO2010/113971
Patent Reference 3: PCT-WO2016/0633994
Patent Reference 4: Japanese Patent Kokai No. 2002-313424
Patent Reference 5: Japanese Patent Kokai No. 2014-238925
Patent Reference 6: PCT-WO2013/073038

SUMMARY OF THE INVENTION

Problems to be Solved by the Invention

The purpose of this invention is to obtain a conductive polymer solid state electrolyte rechargeable battery in no use of separator, which has a descending effect of particle interface resistance between a positive and a negative active materials in case of using a conductive polymer solid electrolyte, a thin film cell, a less dependence on operating temperature, in other words operating at low temperature and excellent safety in case of happening short circuit.

Means to Solve the Problems

The purpose is to achieve providing a solid state electrolyte rechargeable battery in no use of separator comprising a positive electrode/a conductive polymer electrolyte layer/a negative electrode, in which the solid state electrolyte layer is a composition comprising an inorganic solid electrolyte and a polymer electrolyte composition wherein the polymer electrolyte composition is selected from the group consisting of a polymer electrolyte composition ($X^1$) obtained by graft polymerizing or living radical polymerization of a molten salt monomer having a polymerizable functional group and having an onium cation and an anion containing a halogen with a fluoro polymer, and a polymer electrolyte composition comprising ($X^1$) and at least one kind selected from the following ($X^2$) and ($X^3$), $X^2$: a molten salt having an onium cation and an anion containing a halogen, or a molten salt monomer having a polymerizable functional group and having an onium cation and an anion containing a halogen, $X^3$: a polymer or copolymer of a molten salt monomer having a polymerizable functional group and having an onium cation. and an anion containing a halogen.

The purpose is to achieve providing more favorably a solid state electrolyte rechargeable battery in no use of separator as claimed in claim 1, wherein the solid state rechargeable battery comprising a positive electrode/a conductive polymer solid state electrolyte layer/a negative electrode further contains a polyether polymer partially.

The purpose is to achieve providing more favorably a solid state electrolyte rechargeable battery in no use of separator as claimed in claim 1, wherein the positive electrolyte is at least one kind selected from the group consisting $Li_xMe_yO_z$, $LiNixMe_yO_z$, $LiCo_wNi_xMe_yO_z$, and $LiMe_xP_yO_z$ (w, x, y and z is optional positive number; Me is Fe, Co, Ni, Al or Mn) and the negative electrolyte is at last one kind selected from the group consisting of a natural spheroidal graphite, an artificial hard graphite, and a lithium metal foil.

Advantage of the Invention

According to this invention as apparent from the later mentioned Examples, a solid state electrolyte rechargeable battery in no use of separator has a depression effect of particle interface resistance between a positive and a negative active materials in case of using a conductive polymer solid electrolyte, a thin film cell, a less dependence on temperature and an excellent safety in case of happening short circuit. Especially, in case of using a lithium metal foil as a negative electrode, a thickness of the cell becomes thinner, and in case of coating allyl glycidyl ether polymer on the surface of the positive and/or negative electrodes, REDOX resistance makes enhanced.

PREFERRED EMBODIMENT OF THE INVENTION

In this invention, by utilizing simultaneously inorganic solid electrolyte and also polymer electrolyte composition as the electrolyte phase, the advantages as mentioned above are achieved.

First, polymer electrolyte composition ($X^1$) obtained by graft polymerizing or living radical polymerization of a molten salt monomer having a polymerizable functional group and having an onium cation and an anion containing a halogen with a fluoro polymer is mentioned below.

As a fluoro polymer used by graft polymerization or living radical polymerization, a polyvinylidene fluoride polymer or copolymer are preferably raised.

As the polyvinylidene fluoride copolymer, a copolymer having a unit of vinylidene and a unit specifying $$—(CR^1R^2—CFX)—\quad\text{Formula}$$

In formula, X is of halogen atom except fluorine atom.
$R^1$ and $R^2$ are hydrogen atom or fluorine atom, each is same or different atom, halogen atom is chlorine atom as the best, bromine atom or iodine atom also.

This co-polymer having $$—(CR^3R^4—CR^5F)_n—(CR^1R^2—CFX)_m—\quad\text{Formula:}$$

In formula, X is of halogen atom except fluorine atom. $R^1$, $R^2$, $R^3$, $R^4$ and $R^5$ are hydrogen atom or fluorine atom, each is same or different atom
"n" is 65 to 99 mol %, "m" is 1 to 35 mol %.
is preferred and the best co-polymer is $$—(CH_2—CF_2)_n—(CF_2—CFCl)_m—\text{Formula:}$$

In formula, "n" is 99 to 65 mol %, "m" is 35 to 1 mol %.
In case that "n" plus "m" is of 100 mol %, it is preferred to formulate "n" in 65 to 99 mol % and "m" in 1 to 35 mol %. The better formula is "n" in 67 to 97 mol % and "m" in 3 to 33 mol %. The best formula is "n" in 70 to 90 mol % and "m" in 10 to 30 mol %.

The said co-polymer is of block polymer or random co-polymer. And other monomers obtaining co-polymer are also utilized in a range of conforming to the purpose of this invention.

The molecular weight of the said polymer is 30,000 to 2,000,000. better as a mean molecular by weight. And the more preferred molecular by weight is 100,000 to 1,500,000. The mean molecular by weight is calculated based on the intrinsic viscosity[η] in an estimated formula.

In case of proceeding a graft polymerization of a molten salt monomer with the said co-polymer, it is adaptable an atom transfer of radical polymerization with transition metal complexes. This transition metal positioning on the complex become a trigger by pulling out halogen atom such as chlorine atom, and the molten salt monomer on the said polymer is graft-polymerized with the said co-polymer. Further a homo polymer of vinylidene fluoride is used.

In the atom transfer radical polymerization utilized in this invention, the co-polymer of vinylidene fluoride monomer and vinyl monomer containing fluorine and halogen atoms such as chlorine is utilized better. The graft polymerization of molten salt monomer is started by occurring easily pulling out halogen atom such as chlorine atom except fluorine atom faster than fluorine atom by a transition metal which is to weaken a connection energy between carbon and halogen with presence of fluorine and halogen atoms such as chlorine in a part of trunk polymer.

Catalysts in the atom transfer radical polymerization are utilized a transition metal halogen materials as proposed particularly Copper Chloride(I) (CuCl), acetylacetonate copper(II) and Copper Bromide(CuBr)(I) and Copper Iodide (CuI)(I) and its same group. Ligand being formed the complex introduces 4,4'-dialkyl-2,2'-bipyridyl(bpy) (alkyl having $C_1$ to $C_8$ carbons such as methyl, ethyl, propyl, butyl are preferably raised), Tris(dimethyl aminoethyl)amine ($Me_6$-TREN), N,N,N',N'',N''-Pentamethyl diethylenetri-amine (PMDETA), N,N,N',N'-Tetrakis (2-pyridylmethyl) ethylenediamine (TPEN), tris (2-pyridylmethyl) amine (TPMA) and its same group.

In this material list, it is much better utilized the transfer metal halogen complex formulating Copper Chloride(I) (CuCl) and 4,4'-dimethyl-2,2'-bipyridyl(bpy).

The reaction solvent in this invention are utilized to be dissolving the fluoro polymer and as an example N-methyl pyrrolidone, dimethylacetamide, dimethyl sulfoxide, acetone and its same group which dissolve the co-polymer between a polyvinylidene fluoride monomer composition, and a vinyl monomer containing fluorine atom and halogen atom such as chlorine atom. This reaction temperature are dependent on kinds of Ligand complex used, ordinarily in the range of 10 to 110° C.

One of other polymerization methods is utilized also ultraviolet ray with a photo polymerization trigger and is to be irradiated a radiation ray such as electron beam and its same group. This electron beam polymerization method is being to obtain a crosslinking reaction on co-polymer itself and to being possibly a grafting reaction on a reinforcing material of the monomer, which are specified well. The irradiation volume is controlled preferring in 0.1 to 50 Mrad and 1 to 20 Mrad as more preferred.

It is preferable in this invention to make a graft polymerization at range between 2 and 90 mol %, in adjusting the recipe of polymer structure at 98 to 10 mol % as monomer unit and 2 to 90 mol % of the molten salt monomer to meet plastic physical properties aimed as the controlling target. To obtain the desired result, a graft ratio of the graft is preferably 40 to 85 mol %, and more preferably 50 to 80 mol %. In case of making a graft polymerization of the molten salt monomer on the said polymer, the polymer is of liquid or solid. These graft polymers are obtained by the methods as described in the prior art, WO2010/113971.

In this invention, a molten salt monomer having a polymerizable functional group and having an onium cation and anion containing a fluorine with a fluorine containing a polymer of which salt structures are related onium cation having an aliphatic, an alicyclic, an aromatic or a heterocyclic radical, and anion containing fluorine as preferred.

This onium cation means ammonium cation, phosphonium cation, sulfonium cation, onium cation, or guanidium cation. As an ammonium cation, quaternary ammonium cation, heterocyclic ammonium cation such as imidazolium cation, pyridinium cation and piperidinium cation. It is preferred the salt structure consisting of ammonium cation at least one kind selected from ammonium cation group as described below and anion at least one kind selected from anion group as described below.

Ammonium Cation Group:

Pyrrolinium cation, pyridinium cation, imidazolium cation, pyrazolium cation, benzimidazolium cation, indolium cation, carbazolium cation, quinolinium cation, pyrrolidinium cation, piperidinium cation, piperazinium cation, alkylammonium cation including substituted with alkyl, hydroxyalkyl or alkoxy alkyl radicals having 1 to 30 carbon atoms (for example 1 to 10 carbon atoms), These are connected hydrocarbon radicals having 1 to 30 carbon atoms (for example 1 to 10 carbon atoms), hydroxyalkyl or alkoxyalkyl radicals on N and/or cyclic radical of the ammonium cation.

Anion Group:

Phosphonium Cation Group:

Tetra alkyl phosphonium cation (for example 1 to 30 carbon atoms), trimethyl ethyl phosphonium cation, triethyl methyl phosphonium cation, tetra amino phosphonium cation, trialkyl hexadecyl phosphonium cation (alkyl having 1 to 30 carbon atoms), triphenyl benzyl phosphonium cation, phosphonuim derivatives having three alkyl groups in which each alkyl has 1 to 30 carbon atoms. Hexyl trimethyl phosphonium cation, asymmetry trimetyl octyl phosphonium cation, Sulfonium Cation:

Trialkyl sulfonium cation, diethyl metyl sulfonium cation, dimethyl propyl sulfonium cation, asymmetric sulfonium of dimethl hexyl sulfonium Anion group containing halogen atom:

As the anion group containing halogen atom, anion group containing fluorine, anion group containing chlorine atom, anion group containing bromine atom are raised. Among them, anion group containing fluorine is more preferable to achieve the desired object of this invention $BF_4^-$, $PF_6^-$, $C_nF_{2n+1}CO_2^-$ in n=1 to 4 as an integer whole number, $C_nF_{2n+1}SO_3^-$ in n=1 to 4 as an integer whole number, $(FSO_2)_2N^-$, $(CF_3SO_2)_2N^-$, $(C_2F_5SO_2)_2N^-$, $(CF_3SO_2)_3N^-$, $CF_3SO_2$—N—$COCF_3^-$, R—$SO_2$—N—$SO_2CF_3^-$ wherein R is aliphatic group, $ArSO_2$—N—$SO_2CF_3^-$ wherein Ar is aromatic group, $CF_3COO^-$ and its same group containing halogen atom, are raised.

Materials described above in the ammonium cation group and anion group are utilized preferably lithium ion battery including lithium ion capacitor, an electrolytic capacitor by reasons of enhancing a thermal stability, Durability properties in REDOX and making wider electric potential window, in which a lithium ion battery containing the above material can be used in the range of 0.7 to 5.5 V of higher voltage and a capacitor containing the above material can be used in the range of less than −45° C. of extremely low temperature. Also, the above material can be used in paint, adhesive, pressure sensitive adhesive, surface coating agent, shaped articles as additives and further the above material can render the non-conductive layer of anti-static property. Further in case of blending the above material and another resin, good dispersing property and smooth phase on the surface of the shaped articles can be improved.

Polymeric radicals of the monomer are indicated C—C unsaturated radicals such as vinyl, acryl, methacryl, acrylamide, allyl radicals and its same group, cyclic-ether group as epoxy, oxetane radicals and its same group, cyclic-sulfide group such as tetrahydrothiophene or isocyanate radical and its same group.

(A) Ammonium cation group having polymeric radicals preferred particularly include Trialkyl aminoethyl methacrylate ammonium, trialkyl aminoethyl acrylate ammonium, trialkyl amino propyl acryl amido ammonium, 1-alkyl-3-viny imidazolium, 4-vinyl-1-alkylpyridinium, 1-(4-vinylbenzyl))-3-alkyl imidazolium, 2-(methacryloyloxy) dialkyl ammonium, 1-(vinyl oxyethyl)-3-alkylimidazolium, 1-vinyl imidazolium, 1-allylimidazolium, N-alkyl-N-allyl ammonium, 1-vinyl-3-alkylimidazolium, 1-glycidyl-3-alkyl-imidazolium, N-allyl-N-alkyl pyrrolidinium or quaternary diallyl dialkyl ammonium cations. All alkyls therein contain 1 to 10 carbon atoms.

(B) Anion group preferred particularly include bis (trifluoro methyl sulfonyl) imide anion, bis (fluoro sulfonyl) amide anion, 2,2,2-trifluoro-N-{(trifluoromethyl) sulfonyl}acetoamide anion, bis{(pentafluoro) sulfonyl}imide anion, tetra fluoroborate anion, hexafluorophosphate anion, trifluoro methane sulfonyl imide anion and its same group. Anions having halogen atom therein are more preferred.

Besides, the molten salt monomer as salt of cation and anion group described above are most preferably included trialykyl aminoethyl methacrylate ammonium bis (fluoro sulfonyl)amide, 2-(methacryloyloxy) dialkyl ammonium bis (fluoro sulfonyl)amide, wherein alkyl is $C_1$ to $C_{10}$ alkyl, N-alkyl-N-allyl ammonium bis (trifluoro methyl sulfonyl) amide wherein alkyl is $C_{10}$ to $C_{10}$ alkyl, 1-vinyl-3-alkylimidazolium bis(trifluoro methyl sulfonyl)amide wherein alkyl is $C_1$ to $C_{10}$ alkyl, 1-vinyl-3-alkylimidazolium tetrafluoroborate wherein alkyl is $C_1$ to $C_{10}$ alkyl, 4-vinyl-1-alkyl pyridinium bis(trifluoro methyl sulfonyl)amide wherein alkyl is $C_1$ to $C_{10}$ alkyl, 4-vinyl-1-alkylpyridiium tetra fluorate wherein alkyl is $C_1$ to $C_{10}$ alkyl, 1-(4-vinylbenzil)-3-alkylimidazolium bisktrifluoro methyl sulfonyl) amide wherein alkyl is $C_1$ to $C_{10}$ alkyl, 1-glycidyl-3-alkyl-imidazolium bis{trifluoromethyl}sulfonyl}amide wherein alkyl is $C_1$ to $C_1$ alkyl, trialkyl amino ethyl methacrylate ammonium trifluoro methane sulfonyl amide wherein alkyl is $C_1$ to $C_{10}$ alkyl, 1-glycidyl-3-alkyl-imidazoliium tetrafluoroborate wherein alkyl is $C_1$ to $C_{10}$ alkyl, N-vinyl carbazolium tetrafluoroborate wherein alkyl is $C_1$ to $C_{10}$ alkyl and its same group. Those molten salt monomer is utilized one kind or more than two kinds. These molten salt monomers are obtained by the methods as described in the prior art of WO2010/113971.

Graft ratio of the molten salt monomer on the co-polymer described above is preferred in the range of 2 to 90 mol %, more preferred 10 to 85 mol % and the most preferred 20 to 80 mol %. In the lower range of graft ratio, for example, 2 to 40 mol %. preferably 5 to 35 mol %, more preferably 5 to 30 mol % the flexibility such as sponge is obtained, and further an adhesive strength, an elasticity can be improved better. In the higher range of graft ratio, for example, 41 to 90 mol %. preferably 45 to 85 mol %, more preferably 50 to 80 mol %, an adhesive strength is improved better due to the increase of a viscoelasticity, and further a pressure sensitive adhesive strength, an anti-cracking property, a dispersing property of particles such as pigment, a stability on PH, a stability on temperature and a conductivity can be improved better. The measure of graft ratio is described in the later Example.

This graft polymerization of the molten salt monomers is preferred either sole or co-polymerization of the molten salt monomer with other monomers making co-polymerization with the molten salt monomer.

In polymer electrolyte composition ($X^1$), SEI (Solid Electrolyte Interphase) such as Vinylidene carbonate, vinylene acetate, 2-cyanofuran, 2-thiophenecarbonitrile, acrylonitrile, membrane forming material or solvents can be contained Further by adding at least one member selected from the group consisting of a molten salt having a onium cation and an anion containing fluorine, or a monomer having an onium cation and an anion containing fluorine and polymerizable functional group ($X^2$), and a polymer or copolymer of the above mentioned monomer ($X^3$), to the above polymer electrolyte ($X^1$) composition, the conductivity and its durability are improved better.

Herein as a molten salt having an onium cation and an anion containing fluorine, the above mentioned molten salt having ammonium cation group and anion group containing halogen, for example, various ion liquids such as cyclic conjugated ion liquid sharing a cation with two nitrogen, noncyclic aliphatic ion liquid containing alkylammonium or phosphonium, cyclic aliphatic ion liquid containing quaternary ammonium, or pyrrolidinium are raised.

Specifically, 1-ethyl-3-methyl imidazolium bis (fluoro methane sulfonyl) amide (EMI·FSI), 1-ethyl-3-methylimidazoliumbis(trifluoro methane sulfonyl) amide (EMI·TFSI), 1-butyl-3-methylimidazoliumbis(fluoro methane sulfonyl) amide (BMI·FSI) and so on are raised preferably.

Further as a monomer having onium cation and anion containing halogen and polymerizable functional group, the abovementioned molten salt monomer used in the graft polymerization is raised.

And as a polymer or copolymer of the abovementioned monomer, a homo polymer of the abovementioned molten salt monomer is preferably raised.

Among these homo-polymers, homo-polymers of monomers such as 1-alkyl-3-vinyl imidazolium cation (AVI), 4-vinyl-1-alkylpyridinium cation, 1-(4-vinylbenzyl))-3-alkyl imidazolium cation, 1-(vinyloxy ethyl)-3-alkylimidazolium cation, 1-vinyl imidazolium cation, quaternary diallyl dialkyl ammonium cation (DAA), 2-(methacryloyloxy) ethyl trimethyl ammmonium (MO-ETMA) cation, Dialkyl (aminoalkyl)acrylamide, dialkyl (amino alkyl) acrylate, Hydroxy alkyl methaacrylate are preferable. Further copolymers of the above mentioned molten salt monomers and other co-monomer are utilized.

Further in these homo-polymers and copolymers ($X^3$) the monomers other than the molten salt monomer are utilized within the range not hindered and within the range of forming polymer matrix.

These homopolymers and copolymers are obtained by radical polymerization using azo catalyst (AIBN), peroxide catalyst (BPO), or by cation polymerization using Lewis acid, Bronsted acid, or by living radical polymerization using azo catalyst AIBN, BPO. Among these polymerization, living radical polymerization is preferable.

The amount of polymer electrolyte composition ($X^1$) is 5 to 90 wt. %, preferably 10 to 75 wt. % based on the total amount of a molten salt monomer ($X^2$) and/or homopolymer or copolymer of a molten salt monomer ($X^3$). In this invention by adding using ($X^2$) and/or ($X^3$) to ($X^1$), a conductivity, an adhesiveness and the durability are increased. Among ($X^2$) and ($X^3$), one or more are utilized.

In this invention, by the addition of a charge transfer ion source (supporting salt) the conductivity and durability of conductivity are preferably improved. Herein as an ion transfer source lithium salt is typically utilized wherein it is more preferred lithium salt consisting of lithium cation and anion having fluorine atom.

As the ion transfer sources the following salts such as lithium salt are raised; $LiBF_4$, $LiPF_6$, $C_nF_{2n+1}CO_2Li$ wherein n=1 to 4 is an integer whole number, $C_nF_{2n+1}SO_3Li$ wherein n=1 to 4 is an integer whole number, $(FSO_2)_2NLi$ (LiFSI), $(CF_3SO_2)_2NLi$ (LiTFSI), $(CF_3SO_2)_3NLi$, $(C_2F_5SO_2)_2NLi$, $(FSO_2)_2CLi$, $(CF_3SO_2)_3CLi$, $(C_2F_5SO_2)_3NLi$, $(CF_3SO_2-N-COCF_3)Li$, $Li(R-SO_2-N-SO_2CF_3)$ wherein R is aliphatic such as alkyl or aromatic group), $(C-N)_2C_nF_{2n+1}Li$ wherein n=1 to 4 is an integer whole number).

Further, as an ion transfer source except lithium salt, stannic tin indium oxide (TIO), carbonate salt is raised.

As ion transfer sources, a salt containing nitrogen and preferably the salt consisting of alkylammonium cation such as tetraethylammonium cation or triethyl methyl ammonium cation and the anion containing fluorine atom.

$Et_4-N^+BF_4^-$, $Et_3Me-N^{+BF_4^-}$,
$Et_4-N^+PF_6^-$, $Et_3Me-N^{+PF_6^-}$ and these same group.
Et: Ethyl, Me: Methyl The amount of the ion transfer source in ratio of 0.5 to 60 mol % to polymeric electrolyte composition ($X^1$), preferably 0.7 to 50 mol %.

Alkylene in tetra alkylene glycol dialkyl ether (TAGDAE) which is a pair of ion transfer source means of having 1 to 30 carbon atoms such as methylene, ethylene, propylene, and alkyl in TAGDAE means alkyl having 1 to 30 carbon atoms such as methyl, ethyl, propyl. As tetra alkylene glycol dialkyl ether, tetra ethylene glycol dimethyl ether (TAGDAE) is the most preferable. The amount of TAGDAE is of 0.2 to 60 mol % to the polymeric electrolyte composition $X^1$, preferably 0.4 to 50 mol %.

As an anion supporting salt (charge transfer ion source),
bis (trifluoro methyl)sulfonyl imide,
2,2,2-trifluoro-N-{(trifluoro methyl) sulfonyl} acetoamide,
bis{(pentafluoro) sulfonyl} imide,
bis{(fluoro) sulfonyl} imide,
tetra fluoroborate,
hexafluorophosphate,
trifluoro methane sulfonyl imide and its same group. Anions having halogen atom therein are more preferred.

This supporting salt is used in the polymer electrolyte composition, and also the later mentioned Garnet material and polyether polymer as needed.

The various solvents are used in the polymer electrolyte composition. As the solvent, dimethyl sulfoxide (DMSO), N-methyl pyrrolidone, dimethyl acetoamide, acetone, acetonitrile and mixture thereof are raised.

The inorganic solid electrolyte used in the composition is described as below. As the inorganic solid electrolyte, Garnet material, NASICON type crystal structure, sulfide material are used. As Garnet material is more preferable among them, first the Garnet material is described. As the Garnet material, oxide solid electrolyte such as LLZ, LLT, are raised more preferably.

As the LIZ,
$Li_{6.25}La_3Zr_2Al_{0.25}O_{12}$, $Li_{6.6}La_3Zr_{1.6}Ta_{0.4}O_{12}$
$Li_{6.75}La_3Zr_{1.75}Nb_{0.25}O_{12}$ (Cubic phase), $Li_7La_3Zr_2O_{12}$ (tetra) are raised.

As the LLT,
$Li_{0.33}La_{0.55}TiO_3$ (Cubic phase), $Li_{0.33}La_{0.55}TiO_3$ (Tetragonal phase),
$Li_5La_3Ta_2O_{12}$, $Li_6La_3Ta_{1.5}Y_{0.5}O_{12}$ are raised.

The Garnet ones are not limited to these materials, and the Garnet material substituted each transition metal to other metal element are used in this invention.

Further as the NASICON type crystal structure, the LAGP and the LATP solid electrolyte is raised as mentioned below. Especially oxidized material showing $Li_{(1+x)}Al_xTi_{(2-x)}(PO_4)_3$ (X=0.1 to 1.5, preferably 0.1 to 0.8), for example. $Li_{1.4}Al_{0.4}Ti_{1.6}(PO_4)_3$ are preferable. Further $Li_{(1+4x)}Zr_{(2-x)}(PO_4)_3$ (X=0.1 to 1.5, preferably 0.1 to 0.8) (Part of Zr can be substituted to at least one kind selected from the group consisting of Al, Ca, Ba, Sr, Sc, Y and In) is also raised. By adding this NASICON type crystal structure to the polymer electrolyte composition, the descending effect of particle interface resistance can be rendered.

As the LATP, $Li_3PO_4$, $Li_4SiO_4$, $Li_4SiO_4$—$Li_3PO_4$, $Li_3BO_4$ are raised.

As the LAGP, $Li_{1.5}Al_{0.5}Ge_{1.5}P_3O_{12}$ is raised.

As the Perovskite of the inorganic solid electrolyte, the oxide compound such as $La_xLi_yTiO_z$ is raised.

Further as the sulfide material, $Li_2S \cdot P_2S_5$, $Li_{3.25}P_{0.95}S_4$, $Li_{3.2}P_{0.96}S_4$, $Li_4P_2S_6$, $Li_7P_3S_{11}$ are raised. By using the sulfide material and the polymeric electrolyte composition concerned, the descending effect of particle interface resistance can be rendered and also the generation of toxic gas can be reduced.

The embodiment of using a polyether polymer in a positive electrode/an electrolyte layer/a negative electrode is described as follows.

This embodiment means coating, laminating or impregnating a polyether polymer to the surface of a negative electrode, impregnating a polyether polymer to the surface of a positive electrode, coating or laminating a polyether polymer to the surface of a electrolyte layer, or containing a polyether polymer in a negative electrode, a positive electrode and an electrolyte layer. Among them, the embodiment of coating, laminating or impregnating a polyether polymer to the surface of a negative electrode is preferable.

As the polyether polymer, partially crosslinked polyether polymer is preferable, and cross linked polymer of (1) a polyether obtained by ring-opening polymerizing an allyl glycidyl ether with ethylene oxide and (2) a polyether polyol poly(metha) acrylate polyether polymer obtained by acylating the terminal of three functional polyether polyol obtained by adding glycerin to ethylene oxide with (metha) acryl acid is most preferable. A molten salt and lithium salt are added to a copolymer of glycidyl ether having radical polymerizable allyl group in the side chain and alkylene oxide, and by heating it a molten salt and lithium salt are taken in the polymer matrix As the crosslinked polyether polymer, the crosslinked polymer of a) polyether polymer having at least one

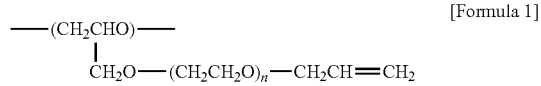
[Formula 1]

(n=0 or 1~12 integer)
and at least one

[Formula 2]

(R means hydrogen or alkyl having not more than 4 of carbon atom) and b) polyether polyol poly(metha)acrylate, is preferable.

Between allyl group in a) component and (metha) acryloyl group in b) component, a radical polymerization reaction occurs, and the obtained crosslinked polymer forms three dimension network structure. Therefore, thus obtained polyether polymer electrolyte phase has an excellent mechanical strength, and a thin electrolyte layer can be obtained. As the efficient effect, the total thickness of the battery can be thin. Further, although it is important that the interface resistance of the electrode and electrolyte in lithium ion battery cell makes smaller, a polyether polymer electrolyte has an excellent affinity to electrode and the integration of the polyether polymer and the electrolyte active material can be done. In this invention as the inorganic solid electrolyte is used, the interface resistance of the active material particle can be reduced through the polyether polyol. Especially by using polyether polyol, the interface resistance of lithium foil negative electrode can be reduced remarkably.

A-Component;

As typical examples of the glycidyl compound (monomer) corresponding to formula 1, allyl glycidyl ether (n=0), ethylene glycol (n=1) or mono allyl mono glycidyl ether of polyethylene glycol having polymerization degree 2~12 (n=2~12) are raised. These are used singly or plurally.

The typical example of monomer corresponding to formula 2 is ethylene oxide.

Other alkylene oxide such as propylene oxide (PO), butylene oxide (BO) can be used with ethylene oxide. Polymer added ethylene oxide to the terminal of PO or BO in the random polymer of PO—BO is preferable. Polymer added BO to the terminal of EO or PO in the random polymer of EO—PO, or polymer added PO to the terminal of EO or BO in the random polymer of EO—PO can be used, A-Component is produced by ring-opening polymerizing a mixture of glycidyl ether corresponding to formula 1 and a monomer containing alkylene oxide corresponding formula. The mixture of monomers can contain other glycidyl ether such as methyl glycidyl ether, ethylene glycol or polyethylene glycol monomethyl glicidyl ether.

As the mixture of monomers, the mixture having 70 to 95 mol % of ethylene oxide, especially 70 to 90 mol % and all glycidyl ether having allyl group and/or not allyl group as remaining unit is preferable. The a) component having 50,000 to 200,000 of number average molecular is preferable. Further, it is preferable to seal the terminal OH group of polymer by etherifying or acylating.

B-Component

B-Component is produced by acylating the terminal of OH group of polyoxy alkylene polyol having more than 2 functional group with reactive derivatives of acrylic acid or methacrylic acid such as acid chloride. The polyoxy alkylene polyol having more than 2 functional group is produced by well known method, for example by random or block addition polymerizing alkylene oxide such as ethylene oxide, ethylene oxide-propylene oxide, or butylene oxide by using polyhydric alcohol such ethylene glycol, glycerin, trimethylol propane or pentaerythritol as an initiator. The number of mols added, based on one OH group of hydric alcohol is not more than 35, particularly not more than 10.

As the process for forming a layer or film of polyether polymer, the process for solving a) component, b) component and lithium salt in non-proton organic solvent, coating or casting this solution to electrode active material layer and then curing it by heating or photo polymerization is raised.

As the solvent for producing this solution, acetonitrile, cyclic carbonate, lactone, cyclic ether, nitrile, chain ether, chain ester of carboxylic acid, chain carbonate, sulfolane, dimethyl sulfoxide, N.N-dimethyl formamide, especially γ-butyrolactone, ethylene carbonate, propylene carbonate, ethyl methyl carbonate, dimethyl carbonate and the mixture thereof are preferable.

The ratio of A-Component/B-Component (A/B) is preferably 1/5 to 5/1. By adjusting the ratio of a/b in this range, physical and rheological property can be adjusted from gel having soft and excellent adhesiveness to gel corresponding to comparative hard solid polymer electrolyte. As desired, to render polyether polymer gel some plasticity, polyethylene glycol dialkyl or dialkenyl ether, or diepoxy polyethylene glycol can be added to the solution before polymerization. In this case the amount of the plasticizer is preferably not more than 50 wt. % of the crosslinked polyether polymer.

The polyether polymer preferably contains 2 to 98 wt. % (the residue is polymer electrolyte composition) of the IPN (Internal Penetration) crosslinked polymer comprising a) component and b) component can be preferably contained. The higher this ratio, the physical and electrical property of the polyether polymer gets closer to the physical and electrical property corresponding to total solid electrolyte. The ratio of the crosslinked polymer to the polyether polymer is preferably at least 2 wt. %. For example, the ratio is preferably at least 50 wt. %. By using these polyether polymers, the redox resistance can be increased, and especially in case of using lithium foil as the negative electrode, the REDOX resistance can be increased more.

As mentioned above, it is the most preferable to coat or impregnate polyether polymer on or into the surface of the negative electrode. Further, by laminating or coating the polyether polymer on the positive electrode, or on the both surfaces of positive and negative electrodes, the desired rechargeable battery can be obtained. Further, it is effective to cast the composition comprising inorganic solid electrolyte and polymer electrolyte composition, to make the membrane thereof and to put the membrane between the positive and the negative electrodes and to cure them. In this case, it is very effective to coat or impregnate the polyether polymer on or into the surface of the negative electrode and/or the positive electrode, to laminate the membrane comprising polymer electrolyte composition and inorganic solid electrolyte to the both surfaces of the electrodes because the descending effect of the interface resistance of the surfaces of both electrodes and polymer electrolyte composition-inorganic solid electrolyte in membrane form can be increased.

Here, in the condition of processing a membrane in laminating these electrodes with the electrolyte, the temperature at 60 to 100° C. for 5 to 60 minutes is preferable. Further, to coat or impregnate the electrolyte on or into the positive and the negative electrodes, respectively is raised, but it is preferable to coat or impregnate only the polymer electrolyte composition containing supporting salt. Further, the LIB cell formed by inserting the polymer electrolyte composition-inorganic solid electrolyte between the positive and the negative electrodes, of which polymer electrolyte composition is containing supporting salt is used. This formation method to make inserting the polymer composition-inorganic solid electrolyte phase into the both electrodes is effective to make thinner in the cell form and also helpful to prevent the destruction of this cell structure.

Polymer conductive component formed in a range of relatively low grafting ratio with the molten salt to fluoropolymer as mentioned above is used for ion conductive binder in manufacturing applications of the both electrodes. In this case, the solid electrolyte might be substituted as a part of conductive agent in 5 to 20 wt. % to the volume of Ion conductive binder.

In this invention, a layer of the polymer electrolyte composition and solid electrolyte phase means a composition comprising polymer electrolyte composition and inorganic solid electrolyte, for example, as the membrane of this composition and also the conductive layer of the composition. In this invention, it is important to contain inorganic solid electrolyte and polymer electrolyte composition in the conductive polymer-inorganic solid electrolyte matrix. It is preferable to contain inorganic solid electrolyte in the positive electrode and the negative electrode respectively in case of aiming the integration (homogenization) of the positive-negative electrodes and the conductive polymer-inorganic solid electrolyte. However, it may not be contained. In case of using a composition comprising polymer electrolyte composition and inorganic solid electrolyte, the amount of the inorganic solid electrolyte is 1 to 99 wt. % based on the total amount of a composition (containing supporting salt) comprising polymer electrolyte composition and inorganic solid electrolyte, preferably 40 to 98 wt. %, more preferably 60 to 95 wt. %.

As the positive electrode used in this invention, lithium compound is preferable.

As the lithium compound, the following compounds are raised.

$LiCoO_2$, $LiNiO_2$, $LiFeO_2$, $LiMnO_3$, $LiMn_2O_4$ $Li_2Mn_2O_4$, $LiNi_{0.5}Mn_{1.5}O_4$, $LiCo_{13}Ni_{13}Mn_{13}O_2$, $LiFePO_4$ $LiCoPO_4$, $LiNiPO_4$, $LiMnPO_4$

Among these positive electrodes, $Li_xMe_yO_z$ such as $LiCo_2$, $LiNiO_2$, $LiFeO_2$, $LiMnO_3$, $LiMn_2O_4$ and $LiMn_2O_4$; $LiNi_xMe_yO_z$ such as $LiNi_{0.5}Mn_{1.5}O_4$; $LiCo_wNi_xMe_yOz$ such as $LiCo_1Ni_1Al_1O_2$, $LiCo_{13}Ni_{13}Mn_{13}O_2$:$LiFePO_4$, $LiCoPO_4$, $LiNiPO_4$ and $LiMnPO_4$ are preferable. Here w, x, y, z means optional positive number respectfully, Me means Fe, Co, Ni, Al or Mn. Other metal may be contained in lithium compound of these positive electrode. Further as the positive electrode, the other positive electrode may be used.

Further in the positive electrode a conductive material may be used in addition to the above positive active material. As the conductive material, natural graphite, artificial graphite, hard carbon, MCMB (mesophase small sphere), nanoparticle carbon, carbon nanofiber (VGCF), or carbon nanotube (CNT) are raised. As the partial substitute of the conductive material, polymer electrolyte composition may be used, and the polymer electrolyte composition having a lower graft ratio may be used as a conductive binder.

As the negative electrode used in this invention, carbon material such as natural graphite, artificial graphite, hard carbon, MCMB (mesophase small sphere), LTO (lithium titanate) such as $Li_4Ti_5O_{12}$, silicon material such as SiO/graphite or lithium metal foil are raised. As the conductive material, natural graphite, artificial graphite, hard carbon, MCMB (mesophase small sphere), nanoparticle carbon, carbon nanofiber (VGCF), or carbon nanotube (CNT) are raised, but in case of using lithium metal foil as the negative electrode, these conductive materials are not needed. The active material used in the negative electrode is the same as one used in the positive electrode or different from one used in the positive electrolyte. However the active material used in the negative electrode and the positive electrode is preferably different.

In this invention by using the inorganic solid electrolyte and the polymer electrolyte composition, LIB cell can be obtained in no use of separator, so called, separator-less LIB can be obtained. However, it is no problem to use the separator, and by using separator having a thin layer of the polymer electrolyte composition to the surface of the separator, practical LIB cell having a constant performance can be obtained.

Further, this invention is illustrated by the following examples.

Example 1

Solid state electrolyte: Garnet and polymer electrolyte composition {graft polymer ($X^1$) and a molten salt ($X^2$) and supporting salt}:

Positive electrode: $LiCo_2$ and conductive material {nanoparticle carbon [Product name: Super C65] produced by Imerys Graphite & Carbon Co.,}:

Negative electrode: natural sphere graphite and conductive material {nanoparticle carbon [Product name: Super P-Li] produced by Imerys Graphite & Carbon Co.,}:

Process for Producing Membrane of Conductive Polymer Electrolyte:

The solid state electrolyte was prepared by mixing 90 wt. % of the inorganic solid electrolyte $Li_7La_3Zr_2O_{12}$ {Product name [LLZO-PT] prepared by Piotrek Co., Ltd.} (90 wt. %), and 10 wt. % of polymer electrolyte composition containing graft polymer ($X^1$) having 70 mol % of graft ratio obtained by graft polymerizing MOETMA-FSI with a vinylidene fluoride copolymer $\{-(CH_2-CF_2)_m-(CF_2-CFCL)_n$ (m=96 mol %, n=4 mol %): utilized Product name [Kureha-K75] produced by Kureha Chemical Co.,} and a molten salt {N-methyl-N-propyl pyridinium bis(fluoro sulfonyl) amide (MPPY-FSI)}($X^2$) containing supporting salt (LiFSI) ($X^2$: LiFSI=1:1).

The above mixture was heated at 50° C. and for 1 hour and as the result the polymer matrix was formed. Then by using acetonitrile solvent, casting solution having 65 wt. % of the solid content was obtained, and then the casting solution was casted and dried at 80° C. and for 30 minutes. The conductive polymer-solid electrolyte membrane having an excellent conductive network and 20 μm of thickness. The conductivity of this conductive polymer-solid electrolyte membrane was $2.6 \times 10^3$ S/cm.

Process for Producing LIB:

The conductive polymer solid state electrolyte membrane was laminated on the above negative electrode, and then the negative electrode laminating with Solid-polymer electrolyte was prepared by pressing process. Further, this half cell form was combined with the above positive electrode by pressing process to complete a separator-less rechargeable LIB flat cell in size of 5×5 cm by vacuum sealing process. The volumetric energy density of this cell was measured at 25° C., and this cell had a stable performance 31 mAh (117.8 mWh) at 3.8 V of average operating voltage, and this shows descending the interface resistance. Further, 94% to the initial volume showed at the 30 cycle property.

Further, measuring at −10° C. and 40° C., it was 27 mAh (−10° C.) and 31 mAh (40° C.) which showed less temperature dependence.

Example 2

Conductive polymer-solid electrolyte: Garnet (80 wt. %) and (20 wt. %) of polymer electrolyte composition electrolyte composition ($X^1$) having 50 mol % of graft ratio, obtained by graft polymerizing MOETMA-FSI with a vinylidene fluoride copolymer {vinylidene fluoride copolymer utilized [Product name: Solvay #5130] produced by Solvay Co.,} containing a molten salt (LiFSI) as a supporting salt which is 30 wt. % to the graft polymer ($X^1$).

Positive electrode: $LiCo_{1 3}Ni_3Mn_{1 3}O_2$ and conductive material {nanoparticle carbon [Product name: Super C65]}. LiTFSI as the supporting salt containing 30 wt. % to the polymer electrolyte composition electrolyte composition was impregnated to the surface of the positive electrode.

Process for Producing the Positive Electrode:

30 wt. % of the supporting salt ($LiBF_4$) to the polymer electrolyte composition ($X^1$) was doped to the polymer electrolyte composition ($X^1$) having 50 mol % of graft ratio, obtained by graft polymerizing MOETMA-FSI with a vinylidene fluoride copolymer [utilized Product name: Solvay #5130] produced by Solvay Co., and then by using acetonitrile, solution of 65 wt. % of the solid content was prepared. The inorganic solid electrolyte (LLZO-PT) was added 10 wt. % to the total content of the polymer electrolyte composition ($X^1$) and the inorganic solid electrolyte to the above solution. This mixed solution was impregnated to the surface of the positive electrolyte $LiCo_{13}Ni_{13}Mn_{13}O_2$ having 1.5 mAh/cm² volume, and then cure treated at 80° C. and for 30 minutes. And the positive electrolyte having the conductive layer of 3.5 g/cm³ of press density. The thickness of the conductive layer is 3 μm. The thickness was sufficient to meet the practical performance.

Further, by carrying out this impregnation, the formation of the conductive network became superior and the particle interface resistance of the conductive polymer layer on the electrode could be descended.

Negative electrode: natural sphere graphite and conductive material {nanoparticle carbon [Product name: Super P-Li]}

The polymer electrolyte composition ($X^1$) containing 20 wt. % of LiFSI as the supporting salt to $X^1$ was impregnated to the surface of the negative electrode, Process for Producing the Negative Electrode:

To the mixture of the polymer electrolyte composition ($X^1$) and an allyl glycidyl polyethylene glycol polymer which ratio is 1:1, 20 wt. % of the supporting salt (LiFSI) to the above mixture was doped, and then by using acetonitrile, the conductive polymer was diluted. Further, 15 wt. % of the inorganic solid electrolyte ($Li_7La_3Zr_2O_{12}$) to the total amount of the polymer electrolyte composition ($X^1$) (containing the supported salt) and the above inorganic solid electrolyte was mixed to the above solution, and the mixed solution of 65 wt. % of the solid content was prepared. This mixed solution was impregnated to the surface of the negative electrolyte of natural spheroidal graphite having 1.6 mAh/cm² volume capacity, and then it was dried at 80° C. and for 30 minutes. And the negative electrolyte processed with the conductive layer was measured at 3.6 g/cm3 as a press density. The thickness of the conductive layer is of 30 μm. The thickness was enough to meet a practical performance. This conductive polymer electrolyte was performed at $1.5 \times 10^{-4}$ S/cm conductivity.

Process for Producing Conductive Polymer-Solid Electrolyte Membrane:

The polymer solid state electrolyte as the mixture of Garnet (LLZO-PT), $X^1$ and LIFSI; containing LiFSI was prepared in the amount of inorganic solid electrolyte was 75 wt. % to the total mixture. By using acetonitrile as solvent, the casting solution was prepared on 65 wt. % of the solid content. The casted film was cured at 80° C. for 30 minutes. And the membrane of the conductive polymer-solid electrolyte in 20 μm formed an excellent conductive network to perform superior conductivity.

In the same manner as Example 1, the above materials formula was successfully obtained a rechargeable LIB battery cell in no use of separator.

This LIB cell was measured at 25° C., and this cell had a stable performance of 37 mAh (144.3 mWh) at 3.9 V as the average operating voltage, and this shows descending the interface resistance. Further, 94% of the initial volume capacity was measured at the 30 cycle property.

Further, measuring at −10° C. and 40° C., it was performed 32 mAh at −10° C. and 35 mAh at 40° C., of which result means less dependence on the temperature.

Example 3

Conductive polymer solid state electrolyte: 80 wt. % of NASICON (LAGP) in ratio with 20 wt. % of polymer electrolyte composition ($X^1$) having 60 mol % of graft ratio obtained by graft polymerizing MOETMA-FSI with a vinylidene fluoride copolymer {vinylidene fluoride copolymer [utilized Product name: Kyner HSV1800] produced by Arkema Co.,} and, homopolymer ($X^3$) of MOETMA-FSI). The ratio of ($X^1$)/($X^3$)=90/10. Positive electrolyte: $LiCoO_2$ and conductive material {nanoparticle carbon [Product name: Super P-Li].
Negative electrolyte: lithium metal foil.
Process for producing the positive electrolyte:

As the positive electrolyte, the above $LiCoO_2$ was used. The polymer electrolyte composition ($X^1$) and homopolymer ($X^3$) was mixed in the ratio of ($X^1$)/($X^3$)=90/10.

And then 30 wt. % of supporting salt ($LiBF_4$) was doped to the mixture, and by using acetonitrile solvent, the solution was prepared in 65 wt. % of the solid content. This solution was coated on the surface of the positive electrode in glovebox under the dew point at −40° C. to make the thickness of impregnated layer at 3 μm, and then dried at 80° C. for 15 minutes.
Process for Producing the Conductive Polymer Electrolyte Membrane:

By using acetonitrile solvent, the above conductive polymer solid state electrolyte was prepared the solution in 65 wt. % of solid content. Further, 30 wt. % of supporting salt (LiFSI) was doped. This solution was coated on the surface of the positive electrode in glovebox under the dew point at −40° C., and then the surface was cured at 80° C. for 30 minutes. The thickness of the membrane was of 15 μm.

One-piece specimen of the positive electrode processed with the conductive polymer-solid electrolyte was prepared.
Process for Producing the Negative Electrolyte:

As the negative electrolyte, lithium metal foil in 200 μm thickness was used. A mixture of the graft polymer ($X^1$), allyl glycidyl polyethylene glycol polymer and inorganic solid electrolyte (LAGP) was prepared, and 20% of supported salt ($LiBF_4$) was formulated to this mixture. And then this conductive polymer as the casting solution was coated on the lithium metal foil in glovebox under the dew point at −40° C. to make the thickness of impregnated layer at 2 μm.

And then, by combining the lithium metal foil processing the conductive polymer with the positive electrode laminating the conductive polymer-solid electrolyte, the separatorless conductive polymer-solid electrolyte LIB flat cell was prepared in the same as Example 1.

At 25° C. this LIB cell had 32 mAh (118.4 mWh) of stable performance at 3.7 V of average operating voltage, and this shows descending the interface resistance. Further, 95% of the initial volume capacity was measured at the 30 cycle property.

Further, measuring at −10° C. and 40° C., it was performed 30 mAh at −10° C. and 34 mAh at 40° C., of which result means less dependence on the temperature.

Example 4

Conductive polymer-solid electrolyte: Garnet-LLZO-PT (90 wt. %) and a polymer electrolyte composition ($X^1$) (10 wt. %) as used in Example 1 (containing supporting salt).

Positive electrode: $LiCo_{1 3}Ni_{1 3}Mn_{1 3}O_2$ and conductive material {nanoparticle carbon [Product name: Super 651]}.
Negative electrolyte: lithium metal foil.

The polymer electrolyte composition ($X^1$), allyl glycidyl polyethylene glycol polymer and solid electrolyte (LLZO-PT) were used in positive electrode and negative electrode. And the above Conductive polymer-solid electrolyte {the polymer electrolyte composition ($X^1$) and Garnet and the supporting salt (LiFSI)} were used in the conductive polymer solid electrolyte membrane. In the same manner as Example 3 except the above, separator-less solid electrolyte rechargeable battery cell was obtained.

At 25° C. this LIB cell had 38 mAh (148.2 mWh) of stable performance at 3.9 V as the average operating voltage, and this shows descending the interface resistance. Further 97% of the initial capacity volume was measured at the 30 cycle property. Further measuring at −10° C. and 40° C., it was 35 mAh (−10° C.) and 38 mAh (40° C.), of which result means less dependence on the temperature.

Example 5

Conductive polymer-solid electrolyte: Garnet (95 wt. %) and a polymer electrolyte composition ($X^1$) (3 wt. %) as used in Example 1 and supporting salt (LiFSI) (2 wt. %).
Positive electrode: $LiFePO_4$ and conductive material {nanoparticle carbon [Product name: Super 65].
Negative electrode: lithium metal foil.

The polymer electrolyte composition ($X^1$) (containing supporting salt) was used in positive electrode, and the polymer electrolyte composition ($X^1$) (containing supporting salt) and allyl glycidyl polyethylene glycol polymer were used in negative electrode. And the above Conductive polymer-solid electrolyte {Garnet, polymer electrolyte composition ($X^1$) and a molten salt (ion liquid) (MPPY-FSI and FSI) ($X^2$) and LiFSI ($X^2$:LiFSI=1:1)} were used in the conductive polymer solid electrolyte membrane. In the same manner as Example 3 except the above, separator-less solid-state electrolyte rechargeable battery cell was obtained.

At 25° C. this LIB cell had 33 mAh (105.6 mWh) of stable performance at 3.2 V as the average operating voltage and this shows descending the interface resistance. Further 98% of the initial volume capacity was measured at the 30 cycle property. Further measuring at −10° C. and 40° C., it was performed 30 mAh (−10° C.) and 34 mAh (40° C.), of which result means less dependence on the temperature.

Example 6

Conductive polymer-solid electrolyte: Garnet-LLZO-PT (90 wt. %), {a polymer electrolyte composition ($X^1$) as used in Example 3 and MOETMA-FSI homopolymer ($X^3$)} (8 wt. %) and {a molten salt (ion liquid) (MPPy-FSI) ($X^2$) and supporting salt LiFSI)} (2 wt. %).

Positive electrode: LiCoO$_2$ and conductive material {nanoparticle carbon [Product name: Super 651]}.

Negative electrode: lithium metal foil.

The polymer electrolyte composition (X$^1$), molten salt (X$^2$) and supporting salt were used in the positive electrode and the above conductive polymer solid electrolyte {Garnet, polymer electrolyte composition (X$^1$), molten salt and a molten salt (X$^2$) and homopolymer (X$^3$) were used in the conductive polymer electrolyte. In the same manner as Example 3 except the above, separator-less solid state electrolyte rechargeable battery cell in which polymer matrix was formed was obtained.

At 25° C. this LIB cell had 34 mAh (125.8 mWh) of stable performance at 3.7 V as the average operating voltage, and this shows descending the interface resistance. Further 99% of the initial volume capacity was measured at the 30 cycle property.

Further measuring at −10° C. and 40° C., it was performed 32 mAh (−10° C.) and 35 mAh (40° C.), of which result means less dependence on the temperature.

Example 7

Conductive polymer-solid electrolyte: Garnet-LLZO-PT, a polymer electrolyte composition (X$^1$) as used in Example 3 and a molten salt (MOETMA-FSI) (X$^2$). Positive electrode: LiNi$_{0.5}$Mn$_{1.5}$O$_4$ and conductive material {nanoparticle carbon [Product name: Super 65]}.

Negative electrolyte: lithium metal foil.

The polymer electrolyte composition (X$^1$) (containing supporting salt) and inorganic solid electrolyte LAGP were used in the positive electrode, and the above conductive polymer solid electrolyte Garnet-LLZO-PT, polymer electrolyte composition (X$^1$), a molten salt of monomer (X$^2$) and supporting salt (LiFSI): the total amount of X$^1$, X$^2$ and LiFSI was 30 wt. % based on the total amount of the above conductive polymer solid electrolyte} were used in conductive polymer electrolyte membrane. And by laminating two layers of polymer electrolyte composition (containing supporting salt) which thickness of the single layer was 2µ to the both surfaces of the above conductive polymer electrolyte membrane (6µ), the electrolyte layer comprising the three layers was obtained. This layer of 2µ of the conductive polymer electrolyte did not contain the Garnet, but it may contain the Garnet.

In the same manner as Example 3 except the above, separator-less solid-state electrolyte rechargeable battery cell in which polymer matrix was formed was obtained.

At 25° C. this LIB cell had 33 mAh (158.4 mWh) of stable performance at 4.8 V as the average operating voltage, and this shows descending the interface resistance. Further 97% of the initial volume capacity was measured at the 30 cycle property.

Further measuring at −10° C. and 40° C., it was performed 30 mAh (−10° C.) and 33 mAh (40° C.), of which result means less dependence on the temperature.

Example 8

Conductive polymer-solid electrolyte: sulfide material (Li$_2$S·P$_2$S$_5$), a polymer electrolyte composition (X$^1$) as used in Example 3, a molten salt (MPPy-FSI) (X$^2$) and supporting salt (LiFSI).

Positive electrode: LiNi$_{0.5}$Mn$_{1.5}$O$_4$ and conductive material {nanoparticle carbon [Product name: Super 65].

Negative electrode: lithium metal foil.

The polymer electrolyte composition (X$^1$) and supporting salt (LiTFSI) were used in the positive electrode, and by hardening the surface of sulfide material inorganic electrolyte with polymer electrolyte composition (X$_1$) (containing supporting salt) and then by heating this mixture at 50° C. and for 1 hour with a molten salt (MPPy-FSI) (X$^2$) and supporting salt (LiFSI) in which ratio is 1/1, polymer matrix was obtained. By using inorganic solid electrolyte (sulfide material) (90 wt. %) and {(X$^1$) (containing supported salt) and (X$^2$)}(10 wt. %), and by heating at 80° C. and for 30 minutes, a conductive membrane was obtained.

The above conductive polymer solid electrolyte {Garnet-LLZO-PT, polymer electrolyte composition (X$^1$), a molten salt of monomer (X$^2$) and supporting salt (LiFSI)} were used in conductive polymer electrolyte membrane. And a solution of inorganic solid electrolyte and polymer electrolyte composition (X$^1$) (containing the supporting salt) was impregnated to the surface of the positive electrode. Then the positive electrolyte and the negative electrolyte lithium metal foil were laminated to the both surfaces of the above conductive polymer electrolyte membrane. In the same manner as Example 3 except the above, separator-less solid electrolyte rechargeable battery cell was obtained.

At 25° C. this LIB cell had 33 mAh (158.4 mWh) of stable performance at 4.8 V as the average operating voltage, and this shows descending the interface resistance. Further 99% of the initial volume capacity was measured at the 30 cycle property.

Further measuring at −10° C. and 40° C., it was performed 30 mAh (−10° C.) and 33 mAh (40° C.), of which result means less temperature dependence.

Comparative Example 1 { Solid Electrolyte Comprising Garnet and Polyethylene Oxide (PEO)}

Using polyethylene oxide, but except that polymer electrolyte composition {(X1) and (X3)} was not used, the solid electrolyte LIB was obtained in the same manner as Example 3.

At 25° C. this LIB cell had 28 mAh of stable performance at 3.7 V as the average operating voltage, but Li ion transfer coefficient (transport number) at not more than 25° C. was lower, and this did not show descending the interface resistance. Further 89% of the initial volume capacity was measured at the 30 cycle property. However at more than 60° C. the solubility of PEO is increased and also the conductivity is increased.

Further measuring at −10° C. and 40° C., it was performed 23 mAh (−10° C.), 30 mAh (40° C.)

And 33 mAh (60° C.), of which result means less dependence on the temperature.

INDUSTRIAL APPLICABILITY OF THIS INVENTION

This invention is greatly expected as the solid electrolyte rechargeable battery in no use of separator which has a descending effect of particle interface resistance between positive and negative active materials using solid electrolyte, a thin film cell, a little temperature dependence and excellent safety in case of happening short circuit.

The invention claimed is:

1. An inorganic solid state electrolyte rechargeable battery containing ion transfer sources in no use of separator comprising a positive electrode/a conductive polymer solid state electrolyte layer/a negative electrode in which the conductive polymer solid state electrolyte layer is a composition comprising at least one inorganic solid electrolyte, a polymer electrolyte composition and an ion transfer source, the inorganic solid electrolyte is at least one inorganic solid electrolyte selected from the group consisting of Garnet material, NASICON type crystal structure, perovskite-type material and sulfide material, and a polymer electrolyte composition wherein the polymer electrolyte composition is a polymer electrolyte composition ($X^1$) having a graft ratio in the range of 2 to 90 mol %, obtained by graft polymerizing a molten salt monomer having a polymerizable functional group and having an onium cation and an anion containing a fluorine with a vinylidene fluoride polymer or copolymer, and at least one selected from the group consisting of ($X^2$) and ($X^3$) $X^2$: a molten salt having an onium cation and an anion containing fluorine, or a molten salt monomer having a polymerizable functional group and having an onium cation and an anion containing a fluorine, $X^3$: a polymer or copolymer of a molten salt monomer having a polymerizable functional group and having an onium cation and an anion in which the amount of the inorganic solid electrolyte is 40 to 98 wt. % based on the total amount of the polymer electrolyte composition, the inorganic solid electrolyte and the ion transfer sources.

2. Solid state electrolyte rechargeable battery in no use of separator as claimed in claim 1, wherein the inorganic solid electrolyte is Garnet.

3. Solid state electrolyte rechargeable battery in no use of separator as claimed in claim 1, wherein the positive electrode/the conductive polymer electrolyte/the negative electrode further contains a glycidyl polyether polymer.

4. Solid state electrolyte rechargeable battery in no use of separator as claimed in claim 1, wherein the inorganic solid electrolyte is $Li_2S \cdot P_2S_5$ and/or LIPS derivatives as sulfide material.

5. Solid state electrolyte rechargeable battery in no use of separator as claimed in claim 1, wherein the negative electrode is a lithium metal foil laminating on copper collector.

6. Solid state electrolyte rechargeable lithium ion battery in no use of separator as claimed in claim 1, wherein the positive electrode and/or the negative electrode contains the inorganic solid electrolyte, ($X^1$) and at least one kind selected from ($X^2$) and ($X^3$).

7. Solid state electrolyte rechargeable lithium ion battery in no use of separator as claimed in claim 1, wherein the inorganic solid electrolyte is sulfide material.

8. Solid state electrolyte rechargeable lithium ion battery in no use of separator as claimed in claim 1, wherein the negative electrode is a lithium metal foil treated the surface thereof with polyether polymer.

* * * * *